(12) United States Patent
Liao

(10) Patent No.: US 8,408,580 B2
(45) Date of Patent: Apr. 2, 2013

(54) BABY STROLLER FOLDING DEVICE

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 284 days.

(21) Appl. No.: 13/013,860

(22) Filed: Jan. 26, 2011

(65) Prior Publication Data

US 2012/0187660 A1    Jul. 26, 2012

(51) Int. Cl.
*B62B 1/00* (2006.01)
(52) U.S. Cl. .................. 280/642; 280/647; 280/650
(58) Field of Classification Search .................. 280/642, 280/647, 648, 649, 650
See application file for complete search history.

(56) References Cited

U.S. PATENT DOCUMENTS

| | | | | |
|---|---|---|---|---|
| 4,191,397 | A * | 3/1980 | Kassai | 280/647 |
| 4,272,100 | A * | 6/1981 | Kassai | 280/650 |
| 5,979,928 | A * | 11/1999 | Kuo | 280/642 |
| 6,485,216 | B1 * | 11/2002 | Cheng | 280/642 |
| 6,869,096 | B2 * | 3/2005 | Allen et al. | 280/642 |
| 7,396,039 | B2 * | 7/2008 | Valdez et al. | 280/642 |
| 7,632,035 | B2 * | 12/2009 | Cheng | 280/642 |
| 7,798,500 | B2 * | 9/2010 | Den Boer | 280/642 |
| 7,798,515 | B2 * | 9/2010 | Valdez et al. | 280/647 |
| 8,100,429 | B2 * | 1/2012 | Longenecker et al. | 280/642 |
| 8,210,562 | B2 * | 7/2012 | Ohnishi | 280/642 |
| 8,226,110 | B2 * | 7/2012 | Liao | 280/642 |
| 8,308,391 | B2 * | 11/2012 | Cheng | 280/642 |

\* cited by examiner

*Primary Examiner* — Jeffrey J Restifo
*Assistant Examiner* — James M Dolak
(74) *Attorney, Agent, or Firm* — Alan Kamrath; Kamrath IP Lawfirm, P.A.

(57) ABSTRACT

The present invention provides a baby stroller folding device comprising an upper stroller frame, having a bendable handle installed at an upper end of the upper stroller frame; a lower stroller frame, with an upper end coupled to the upper stroller frame, and having a front wheel leg of a front wheel and a bendable step pipe disposed at the bottom of the lower stroller frame; a rear wheel leg, disposed separately on both sides of the upper and lower stroller frames, and having the rear wheel installed at the bottom of the rear wheel leg, a first slide member installed at the middle of the rear wheel leg, a pull rod installed between the first slide member and the upper and lower stroller frames, and a latch rod disposed at an upper end of the rear wheel leg; a folding joint, installed separately between the upper and lower stroller frames and the rear wheel leg, for coupling and positioning the upper and lower stroller frames, and the rear wheel leg having internal and external gear discs with a notch each and selectively latched and detached with respect to the latch rod; and a link mechanism, installed between the two rear wheel legs, and having a plurality of pipe frames, slide members, link rods and a start element, and the start element being coupled to the latch rod by a steel rope, such that the baby stroller folding device can fold the baby stroller in longitudinal and transversal directions at the same time smoothly by a simple operation.

6 Claims, 11 Drawing Sheets

BABY STROLLER FOLDING DEVICE

BACKGROUND OF THE INVENTIONH

1. Field of the Invention

The present invention relates to a baby stroller folding device, and more particularly to a baby stroller folding device capable of folding a baby stroller in longitudinal and transversal directions at the same time smoothly by a simple operation.

2. Description of the Related Art

Most conventional baby strollers can be folded longitudinally only, and if a conventional baby stroller is folded transversally, the folding process requires users to use both hands for the operation, so that the operation is more complicated and unsmooth. Furthermore, the volume of the folded baby stroller is still to large, which incurs larger storage space and higher transportation cost. Obviously, the folding of the conventional baby stroller requires improvements.

SUMMARY OF THE INVENTION

Therefore, it is a primary objective of the present invention to provide a baby stroller folding device capable of folding a baby stroller longitudinally and transversally with a simple and smooth operation.

Another objective of the present invention is to provide a baby stroller folding device capable of folding a baby stroller into a smaller volume to facilitate the storage and transportation of the baby stroller.

To achieve the foregoing objective, the present invention provides a baby stroller folding device, comprising: an upper stroller frame, having a bendable handle installed at an upper end of the upper stroller frame; a lower stroller frame, with an upper end coupled to the upper stroller frame, and having a front wheel leg of a front wheel and a bendable step pipe disposed at the bottom of the lower stroller frame; a rear wheel leg, disposed separately on both sides of the upper and lower stroller frames, and having the rear wheel installed at the bottom of the rear wheel leg, a first slide member installed at the middle of the rear wheel leg, a pull rod installed between the first slide member and the upper and lower stroller frames, and a latch rod disposed at an upper end of the rear wheel leg; a folding joint, installed separately between the upper and lower stroller frames and the rear wheel leg, for coupling and positioning the upper and lower stroller frames, and the rear wheel leg having internal and external gear discs with a notch each and selectively latched and detached with respect to the latch rod; and a link mechanism, installed between the two rear wheel legs, and having a plurality of pipe frames, slide members, link rods and a start element, and the start element being coupled to the latch rod by a steel rope, such that the baby stroller folding device can fold the baby stroller in longitudinal and transversal directions at the same time smoothly by a simple operation.

DETAILED DESCRIPTION OF THE PREFERRED EMBODIMENTS

To make it easier for our examiner to understand the technical characteristics and measures of the present invention to achieve the aforementioned objects and effects, we use preferred embodiments with related drawings for the detailed description of the present invention as follows.

Figure 2:
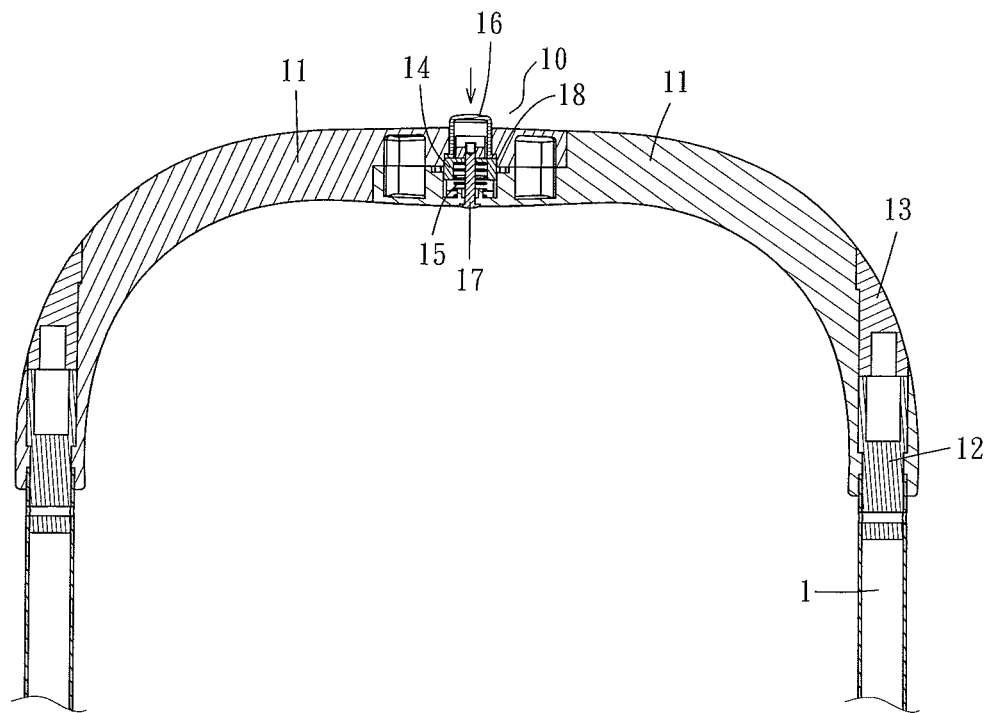
FIG. 2 is a cross-sectional view of a handle of the present invention.
Figure 3:
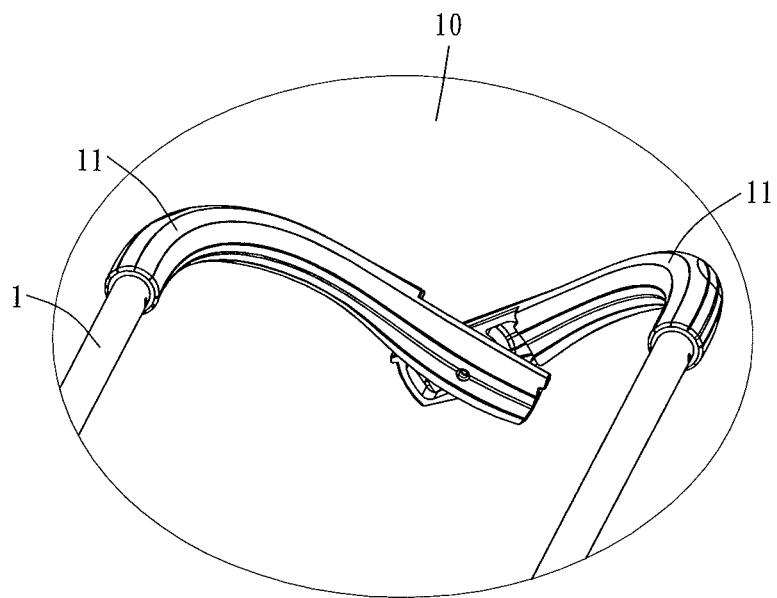
FIG. 3 is a schematic view of bending a handle of the present invention.

With reference to FIGS. 1 to 8 for a baby stroller folding device of the present invention, the baby stroller folding device comprises the following elements:

An upper stroller frame 1, substantially n-shaped, includes a handle 11 disposed at an upper end of the upper stroller frame 1, a bend mechanism 10 disposed on the handle 11 for dividing the handle 11 into left and right halves and having both ends coupled to the upper stroller frame 1 by a rotating shaft 12 and a shaft cover 13, such that the handle 11 can be rotated freely without detaching from the upper stroller frame 1; a positioning gear disc 14 and a spring 15, installed at top and bottom of the middle of the handle 11 respectively and positioned by a push button 16 and a fixing pin 17, and the positioning gear disc 14 can be engaged with a gear slot 18 on the top surface of the right-half handle 11 and a gear slot 18 on the bottom surface of the left-half handle 11, so that both left-half and right-half handles can be fixed with each other by the positioning gear disc and cannot be folded. If the push button 16 is pressed, then the gear disc 14 will be separated from the gear slot 18, and the handle 11 can be folded as shown in FIGS. 2 and 3.

Figure 4:
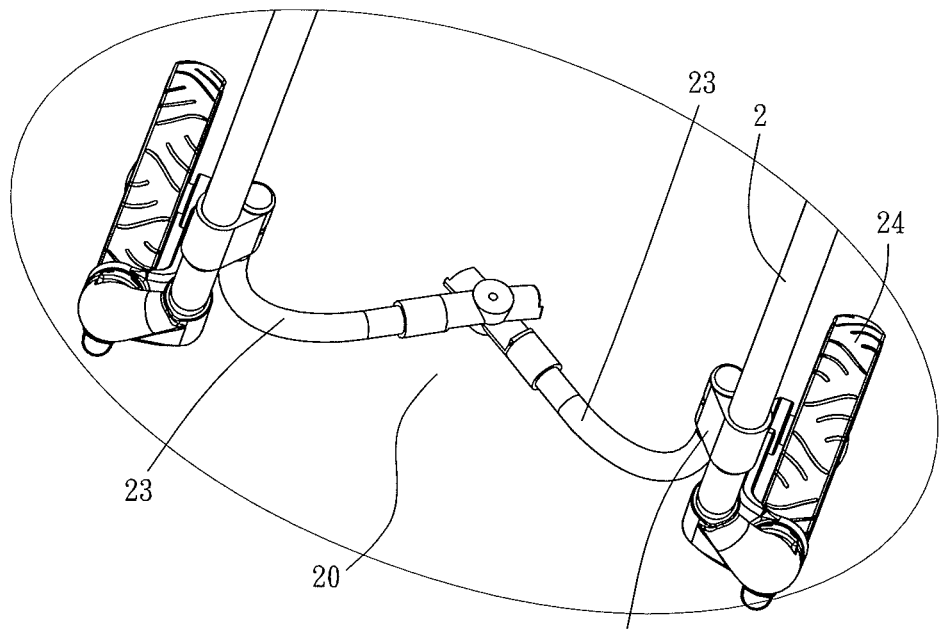
FIG. 4 is a schematic view of bending a step rod of the present invention.

A lower stroller frame 2 is substantially U-shaped with an upper end coupled to the upper stroller frame 1, and a lower end coupled to a front wheel leg 22 and a step pipe 23 by a shaft sleeve 21, and a front wheel 24 is installed at an end of the front wheel leg 22, and the step pipe 23 is divided into left and right halves, and a bend mechanism 20 is installed at the middle, such that the step pipe 23 can be folded as shown in FIG. 4.

Figure 5:
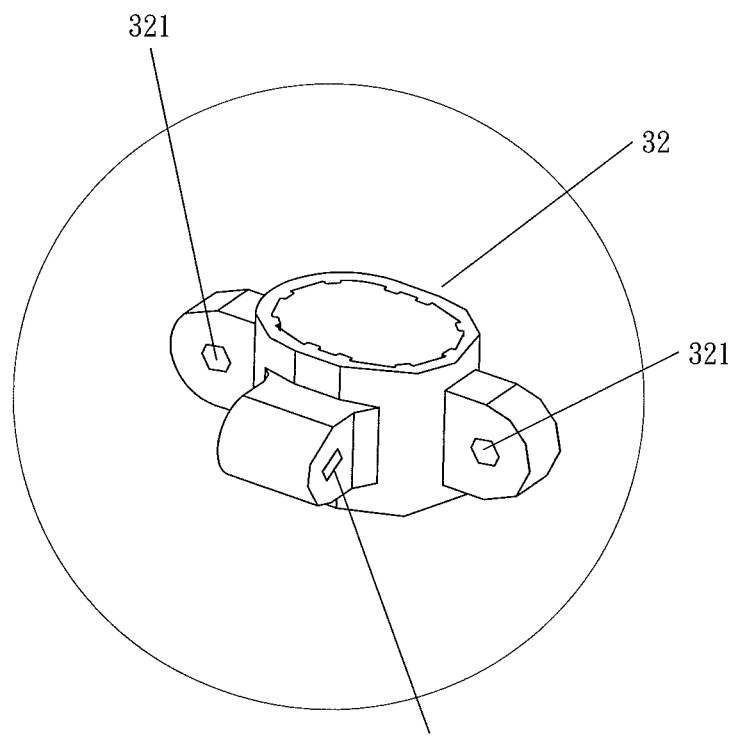
FIG. 5 is a perspective enlarged view of a first slide member of the present invention.

A rear wheel leg 3 is installed separately on both sides of the upper and lower stroller frames 1, 2, and a rear wheel 31 is installed at the bottom end, and a first slide member 32 is installed at the middle as shown in FIG. 5, and two lateral shaft holes 321 and a front shaft hole 322 are formed on the external sides of the slide member 32 respectively, and the two lateral shaft holes 321 are provided for coupling the two pull rods 33 with the upper and lower stroller frames 1, 2 respectively, and the rear wheel leg 3 is situated at an upper end of the first slide member 32 and includes a transverse pipe base 34, a spring base 35, a spring 36 and a latch base 37, and the latch base 37 has a latch rod 371 installed thereon.

Figure 6:
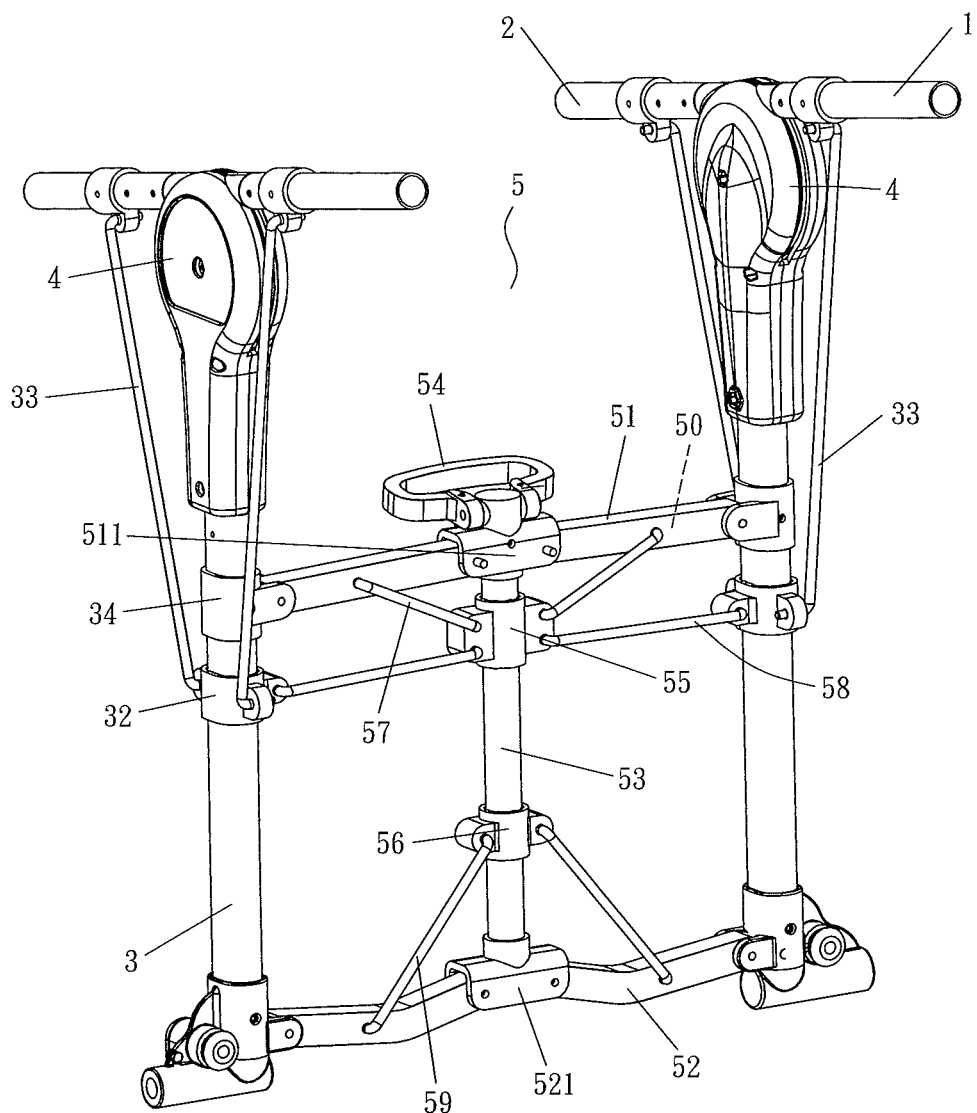
FIG. 6 is a perspective view of a rear wheel leg, a folding joint and a link mechanism of the present invention.
Figure 7:
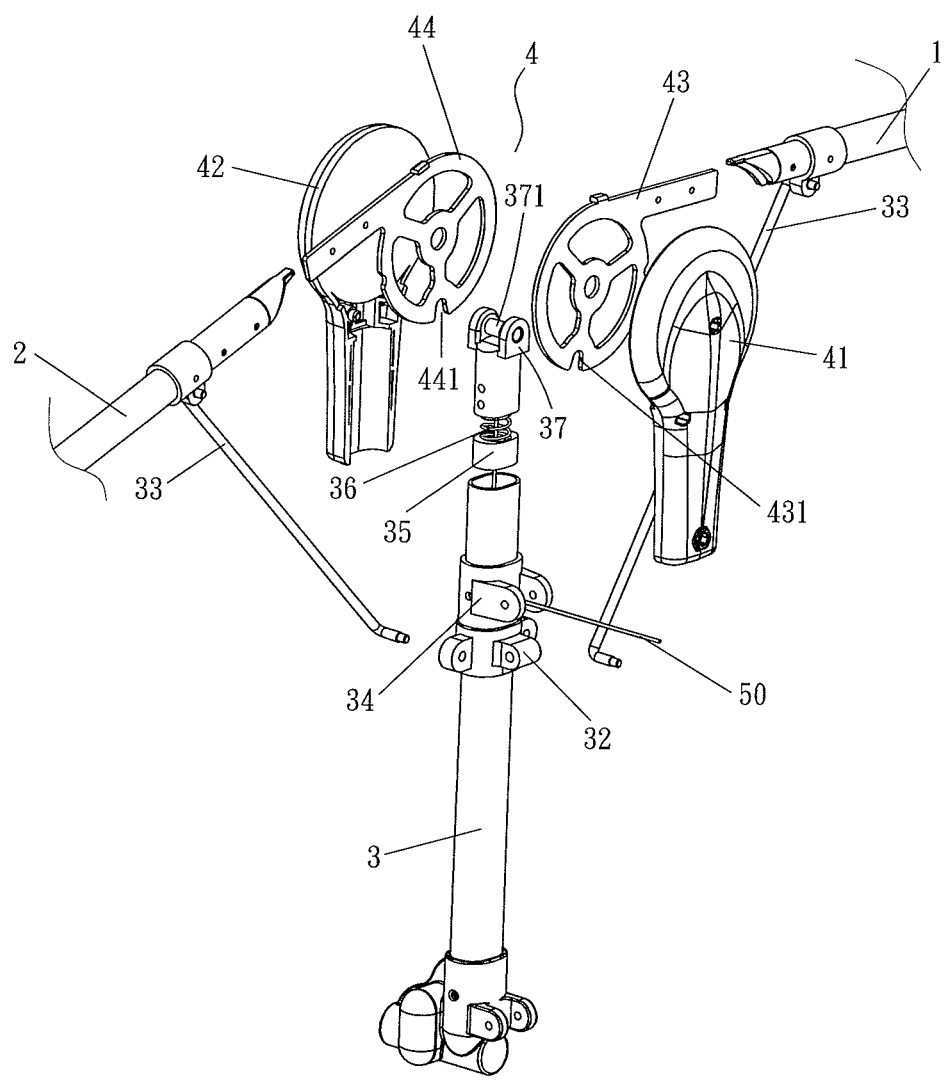
FIG. 7 is an exploded view of a rear wheel leg and a folding joint of the present invention.
Figure 8:
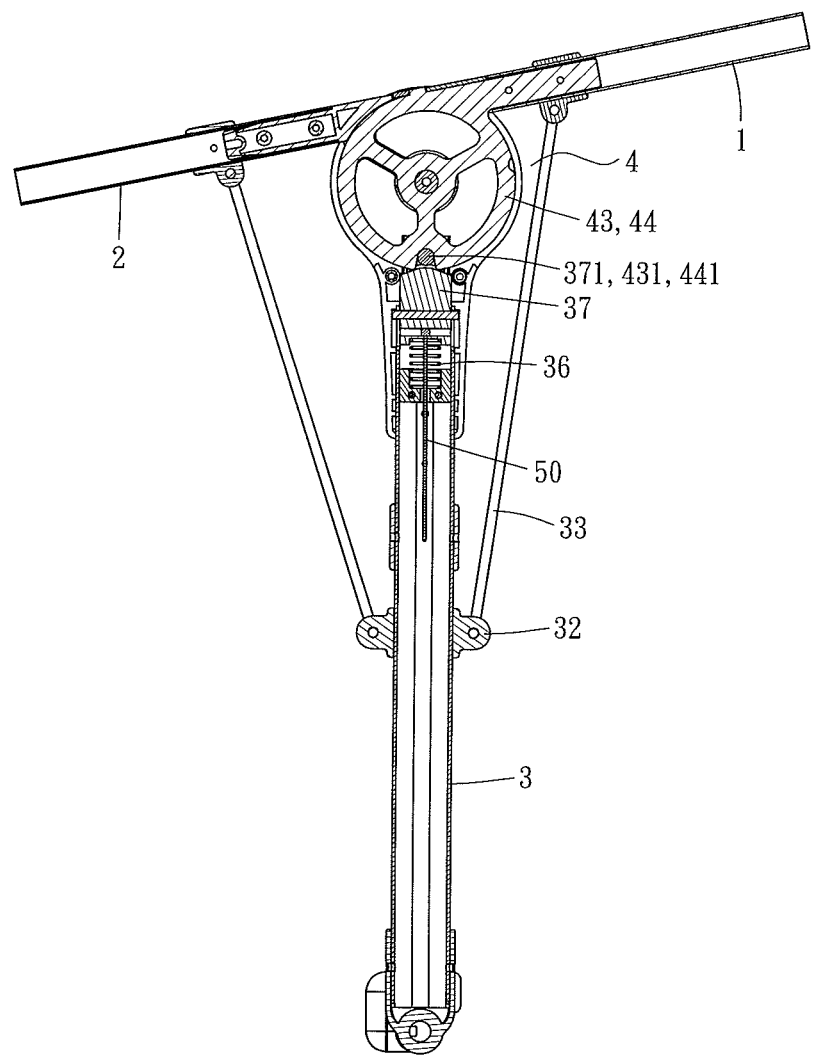
FIG. 8 is a cross-sectional view of a rear wheel leg and a folding joint of the present invention.

A folding joint 4 installed between the upper and lower stroller frames 1, 2 and the rear wheel leg 3 for coupling and positioning the upper and lower stroller frames 1, 2 and the rear wheel leg 3 as shown in FIGS. 6 to 8 includes internal and external covers 41, 42 fixed on internal and external sides of the rear wheel leg 3 respectively; internal and external gear discs 43, 44 are installed onto internal sides of the internal and external covers 41, 42 and coupled to the upper and lower stroller frames 1, 2 respectively, and each has a notch 431, 441 formed thereon.

Figure 9:
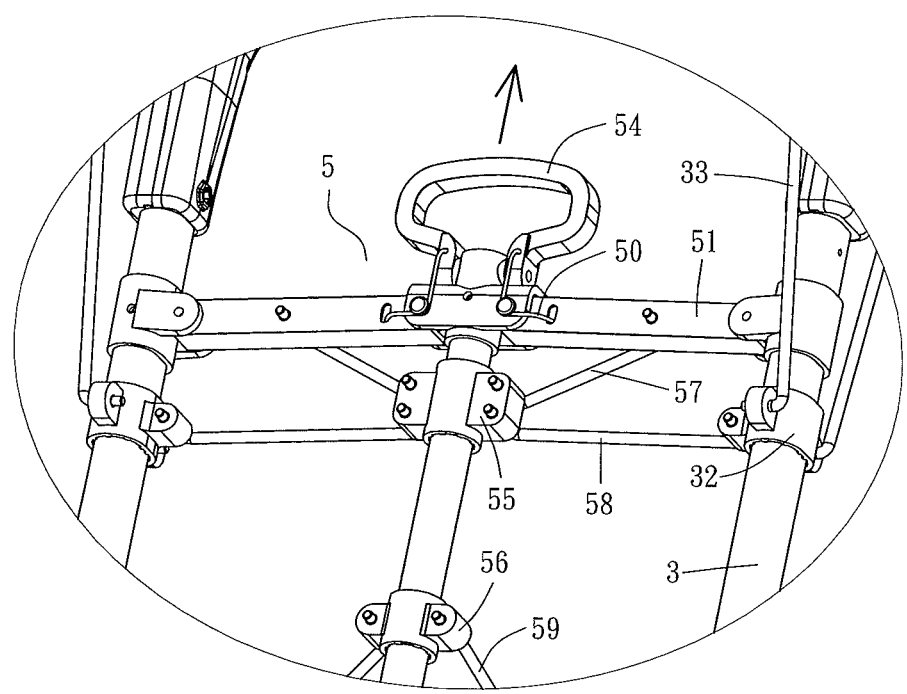
FIG. 9 is a schematic view showing the motion of a link mechanism of the present invention.

A link mechanism 5 installed between the two rear wheel legs 3 as shown in FIGS. 6 to 8 includes a plurality of pipe frames, slide members, link rods and a start element, and the start element is coupled to the latch rod 371 by a steel rope for controlling the latch rod 371 to be latched or detached with respect to the internal and external gear disc notches 431, 441 for folding and unfolding the baby stroller. The structure comprises: upper and lower transverse pipes 51, 52 installed at upper and lower ends of the two rear wheel legs 3 respectively; a base 511, 521 disposed separately at the middle of the upper and lower transverse pipes 51, 52 respectively, such that the upper and lower transverse pipes 51, 52 can be folded; a middle pipe 53, installed between upper and lower transverse pipes 51, 52 (or bases 511, 521), and the upper transverse pipe 51 being protruded from the top end of the middle pipe 53; a start element 54 such as a lifting handle or a pulling ring, installed at an upper end of the middle pipe 53 (or base 511), and coupled to the latch base 37 (or the latch rod 371) by a steel rope 50, whose middle section being passed and hidden between the upper transverse pipe 51 and the rear wheel leg 32; and as shown in FIG. 9, second and third slide members 55, 56 installed at upper and lower ends of the middle pipe 53 respectively, and first, second and third link rods 57, 58, 59, and both ends of the first link rod 57 being coupled to the upper transverse pipe 51 and the second slide member 55 respectively, and both ends of the second link rod 58 being coupled to the first slide member 32 (or the front shaft hole 322) and the second slide member 55, and both ends of the link rod 59 being coupled to the lower transverse pipe 52 and the third slide member 56 respectively.

Figure 1:
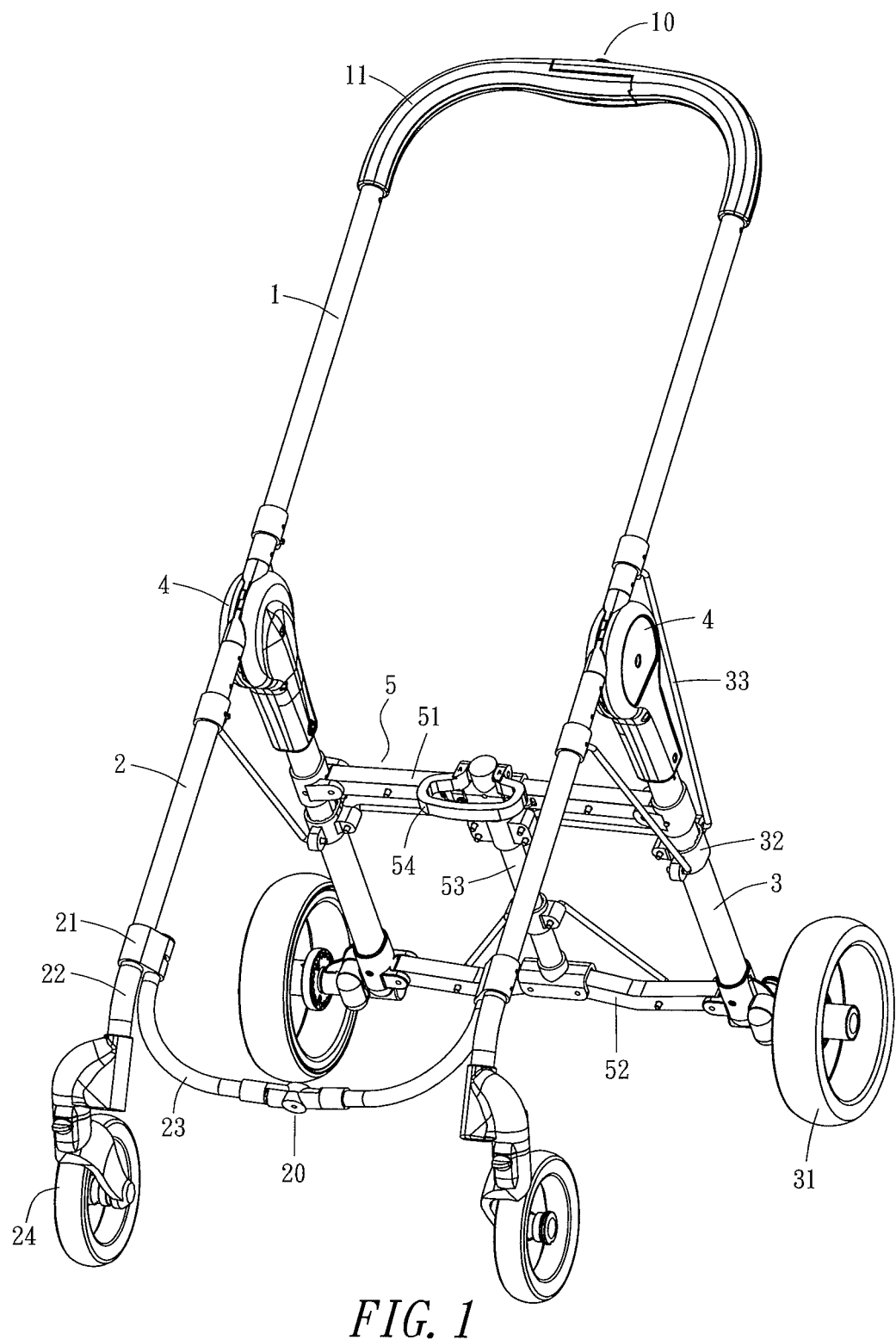
FIG. 1 is a perspective view of an unfolded baby stroller of the present invention.
Figure 10:
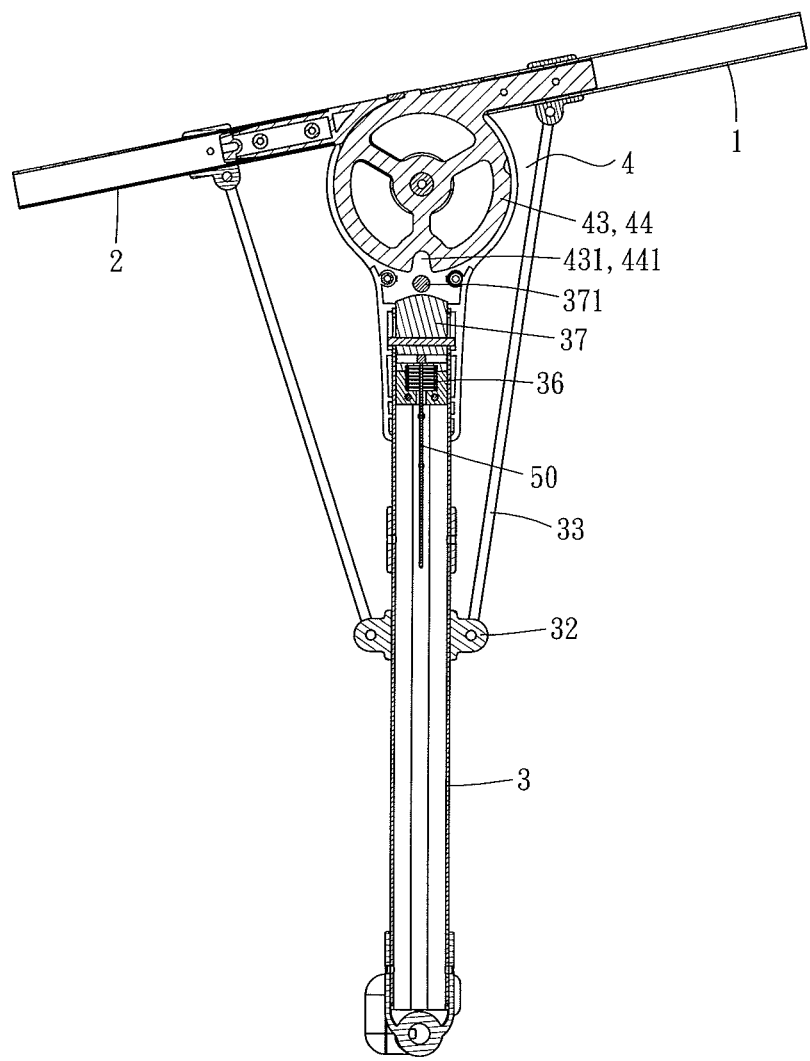
FIG. 10 is a schematic view showing the motion of a rear wheel leg and a folding joint of the present invention.
Figure 12:
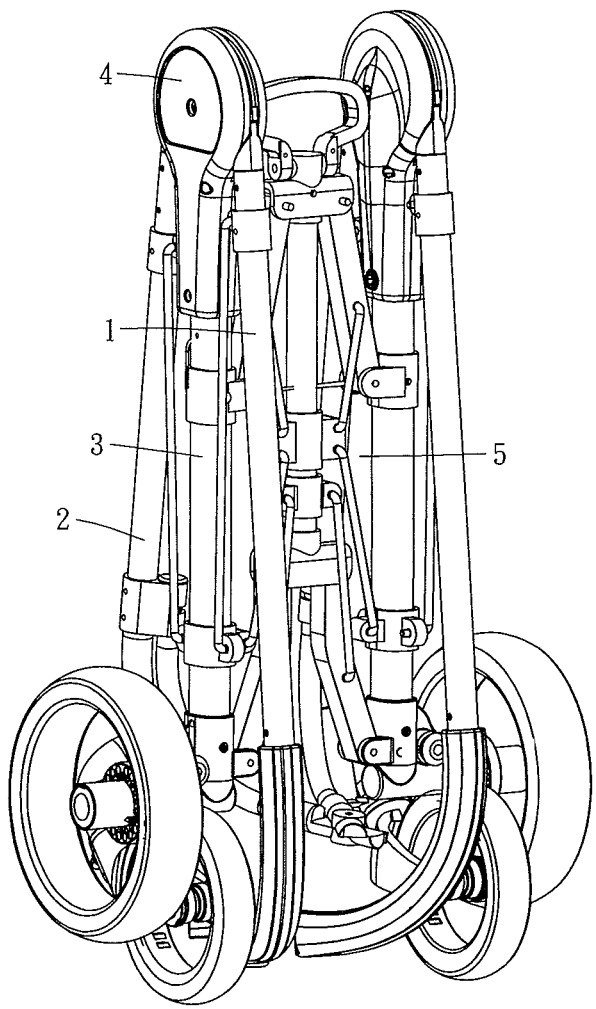
FIG. 12 is a perspective view of a fully folded baby stroller of the present invention.
Figure 13:
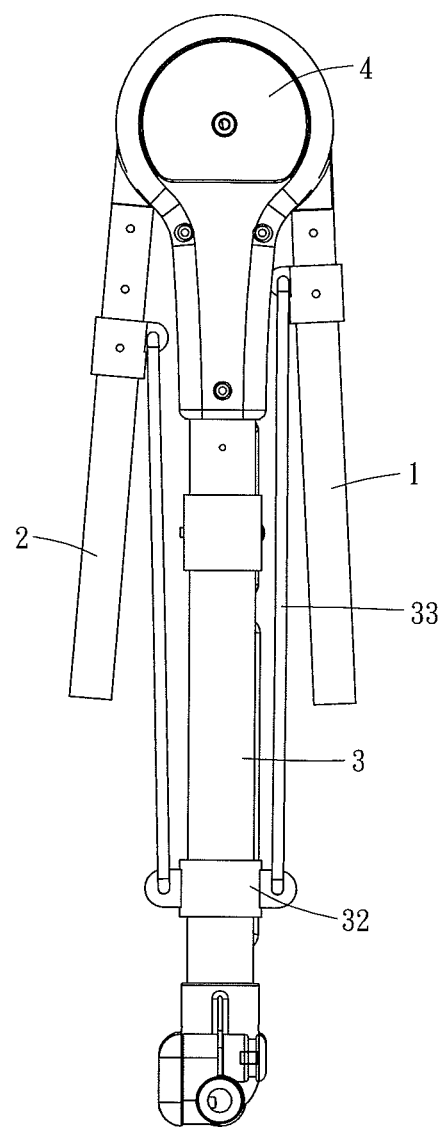
FIG. 13 is a schematic side view of a fully folded baby stroller (excluding the wheels and handle) of the present invention.

According to the aforementioned structure, the baby stroller can be unfolded as shown in FIGS. 1, 2 and 8, and the gear disc 14 of the handle bend mechanism 10 is engaged with the gear slot 18, and the latch rod 371 is latched with the notches 431, 441 of the external gear disc, and the lifting handle 54 of the link mechanism is set at a horizontally released state. If it is necessary to fold the baby stroller, a push button 16 of the handle bend mechanism is pressed, so that the handle 11 can be folded as shown in FIGS. 2 and 3, and then the lifting handle 54 (or start element) of the link mechanism is lifted, so that the latch rod 371 is separated from the notches 431, 441 of the internal and external gear discs as shown in FIGS. 9 and 10. In the meantime, the pull rod 33, and first, second and third link rods 57, 58, 59 are linked, and the lifting handle 54 is lifted while driving the middle pipe 53 to move upward, such that the upper and lower transverse pipes 51, 52 and the second link rod 58 are folded inwardly into a V-shaped, and the first slide member 32 is ascended to link the pull rod 33, so that the upper and lower stroller frames 1, 2 are folded in a direction towards the rear wheel leg 3 to drive the handle 11 and the step rod 23 to be folded as indicated by the arrowhead A of FIG. 11, so as to compete folding the baby stroller as shown in FIGS. 12 and 13.

Figure 11:
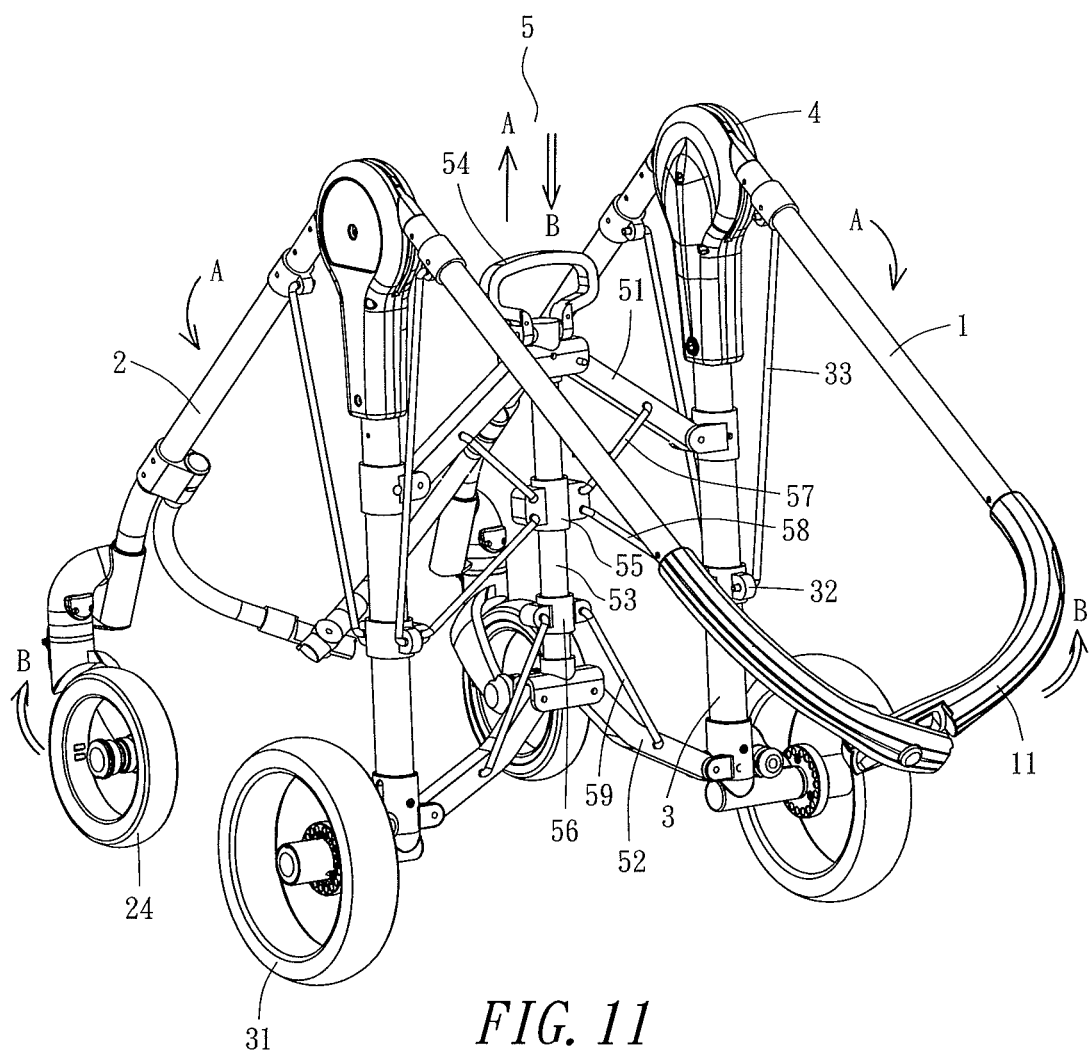
FIG. 11 is a schematic view showing a folding/unfolding motion of the present invention.

If it is necessary to unfold the baby stroller, a user simply lifts the upper stroller frame 1 (or the lower stroller frame 2) by one hand and gradually unfolds the upper and lower stroller frames 1, 2 and the upper and lower transverse pipes 51, 52 outward by the link of the pull rod 33 and the first, second and third link rods 57, 58, 59, so that the lifting handle 54 and the middle pipe 53 are pulled gradually downward to their original positions as indicated by the arrowhead B of FIG. 11 to resume the original unfolded state as shown in FIG. 1. Now, the handle 11 and the step rod 23 are substantially in a flat and straight status, and the latch rod 371 is latched to the notches 431, 441 of the internal and external gear discs as shown in FIG. 8, so that the upper and lower stroller frames 1, 2 and the upper and lower transverse pipes 51, 52 are unfolded and positioned.

In summation of the description above, the present invention at least has the following advantages and effects and improves over the prior art.

1. When the baby stroller is folded, it can be folded both longitudinally and transversally. The same applies to the unfolding operation.
2. The folding or unfolding operation just requires a single-hand operation, and thus it makes the folding and unfolding operation very simple, convenient, and smooth.
3. The baby stroller can be folded into a small volume, since the upper and lower stroller frames 1, 2 or the two rear wheel legs 3 can be close to each other as shown in FIGS. 12 and 13, so as to reduce the folding volume and facilitate storage or transportation.

In summation of the description above, the present invention as disclosed in the preferred embodiments are novel and it achieves the expected objectives and effects and complies with the patent application requirements, and thus is duly applied for patent application.

What is claimed is:

1. A baby stroller folding device, comprising:
   an upper stroller frame, having a bendable handle installed at an upper end of the upper stroller frame;
   a lower stroller frame, with an upper end coupled to the upper stroller frame, and having a front wheel leg of a front wheel and a bendable step pipe disposed at the bottom of the lower stroller frame;
   a rear wheel leg, disposed separately on both sides of the upper and lower stroller frames, and having the rear wheel installed at the bottom of the rear wheel leg, a first slide member installed at the middle of the rear wheel leg, a pull rod installed between the first slide member and the upper and lower stroller frames, and a latch rod disposed at an upper end of the rear wheel leg;
   a folding joint, installed separately between the upper and lower stroller frames and the rear wheel leg, for coupling and positioning the upper and lower stroller frames, and the rear wheel leg having internal and external gear discs with a notch each and selectively latched and detached with respect to the latch rod; and
   a link mechanism, installed between the two rear wheel legs, and having a plurality of pipe frames, slide members, link rods and a start element, and the start element being coupled to the latch rod by a steel rope.

2. The baby stroller folding device of claim 1, wherein the latch rod of the rear wheel leg is installed onto a latch base, and a spring is installed at the bottom of the latch base.

3. The baby stroller folding device of claim 1, wherein the internal and external gear discs of the folding joint are coupled to the upper and lower stroller frames respectively.

4. The baby stroller folding device of claim 1, wherein the link mechanism comprises:

an upper transverse pipe and a lower transverse pipe, installed at upper and lower ends of two rear wheel legs respectively;

a middle pipe, installed between the upper and lower transverse pipes;

a start element, installed at an upper end of the middle pipe, and coupled to the latch rod by a steel rope;

a first slide member and a second slide member, installed at upper and lower ends of the middle pipe respectively; and a first link rod, a second link rod, and a third link rod coupled between the upper and lower transverse pipes and the first, second and third slide members respectively.

5. The baby stroller folding device of claim 4, wherein the start element is a lifting handle.

6. The baby stroller folding device of claim 1, wherein the start element is a lifting handle.

\* \* \* \* \*